United States Patent
Riekehr et al.

(10) Patent No.: US 9,089,929 B2
(45) Date of Patent: Jul. 28, 2015

(54) PROCESS FOR JOINING WORKPIECES MADE OF ZINC-CONTAINING ALUMINUM ALLOYS BY LASER BEAM WELDING

(71) Applicant: Helmholtz-Zentrum Geesthacht Zentrum für Material-und Küstenforschung GmbH, Geesthacht (DE)

(72) Inventors: Stefan Riekehr, Geesthacht (DE); Herman Iwan, Hamburg (DE); Rene Dinse, Gülzow (DE); Volker Ventzke, Hamburg (DE); Peter Haack, Geesthacht (DE)

(73) Assignee: Helmholtz-Zentrum Geesthacht Zentrum für Material-und Küstenforschung GmbH, Geesthacht (DE)

( * ) Notice: Subject to any disclaimer, the term of this patent is extended or adjusted under 35 U.S.C. 154(b) by 318 days.

(21) Appl. No.: 13/849,594

(22) Filed: Mar. 25, 2013

(65) Prior Publication Data
US 2013/0256282 A1 Oct. 3, 2013

(30) Foreign Application Priority Data
Apr. 2, 2012 (EP) .................... 12162865

(51) Int. Cl.
*B23K 26/20* (2014.01)
*B23K 26/32* (2014.01)
*B23K 35/32* (2006.01)
*B23K 26/26* (2014.01)
*B23K 35/00* (2006.01)
*B23K 35/24* (2006.01)

(52) U.S. Cl.
CPC .............. *B23K 26/20* (2013.01); *B23K 26/203* (2013.01); *B23K 26/26* (2013.01); *B23K 26/3226* (2013.01); *B23K 35/002* (2013.01); *B23K 35/24* (2013.01); *B23K 35/32* (2013.01); *B23K 2203/10* (2013.01)

(58) Field of Classification Search
CPC ........ B23K 35/24; B23K 35/32; B23K 26/20; B23K 26/203; B23K 26/32; B23K 26/3226
USPC ........ 219/121.63, 121.64, 121.85; 228/122.1, 228/214, 249, 253–255; 403/265, 270–272
See application file for complete search history.

(56) References Cited

U.S. PATENT DOCUMENTS

| 5,183,992 | A | * | 2/1993 | Bilge et al. | ............... 219/121.64 |
| 5,526,867 | A | * | 6/1996 | Keck et al. | ....................... 164/97 |
| 5,857,141 | A | * | 1/1999 | Keegan et al. | ................ 428/560 |
| 8,876,214 | B2 | * | 11/2014 | Kroener et al. | .......... 297/452.18 |
| 2008/0035615 | A1 | * | 2/2008 | Li et al. | ..................... 219/121.63 |

FOREIGN PATENT DOCUMENTS

EP 1674190 A1 6/2006

OTHER PUBLICATIONS

European Search Report for 12162865.5 mailed Sep. 19, 2012.
Hohenberger B et al: "Laserstrahlschweissen von Aluminiumwerkstoffen", Werkstatttechnik, Springer Verlag. Berlin, DE, Bd. 87, Nr. 6, Jun. 1, 1997, pp. 289-293—XP000725077, ISSN: 0340-4544.
"Anspruchsvolle Werkstoffe riss- und porenfrei schweissen", Schweissen und Schneiden, DVS Verlag, Dusseldorf, DE, Bd. 64, Nr. 3, Mar. 1, 2012, pp. 91-93, XP001573450, ISSN: 0036-7184.

* cited by examiner

*Primary Examiner* — Samuel M Heinrich
(74) *Attorney, Agent, or Firm* — Marshall, Gerstein & Borun LLP

(57) ABSTRACT

The present invention relates to a process for joining workpieces made of zinc-containing aluminum alloys by laser beam welding, in which process a layer consisting of vanadium is introduced into the joining gap between the workpieces to be connected to avoid the formation of pores, and the workpieces are then connected to one another by laser beam welding.

8 Claims, No Drawings

PROCESS FOR JOINING WORKPIECES MADE OF ZINC-CONTAINING ALUMINUM ALLOYS BY LASER BEAM WELDING

CROSS-REFERENCE TO RELATED APPLICATION

The present application claims the benefit of priority of European Application No. 12162865.5 filed Apr. 2, 2012. The entire text of the priority application is incorporated herein by reference in its entirety.

The present invention relates to a process for joining workpieces made of zinc-containing aluminum alloys by laser beam welding.

DESCRIPTION OF THE PRIOR ART

A process for joining workpieces made of conventional aluminum alloys by laser beam welding is known, for example, from EP 1 674 190 A1.

In the case of laser welding, material is melted in the workpiece using a laser beam and, after the melted material has solidified, an integral connection forms. The laser beam penetrates deep into the workpiece on account of its high energy density. When it penetrates into the workpiece, a vapour capillary made up of evaporating workpiece material forms. The vapour capillary is referred to as a keyhole, and is kept open by the vapour pressure of the workpiece material. In this keyhole, the laser radiation is completely absorbed by multiple reflection on the capillary walls, an increase in power then leading primarily to a deeper keyhole and not to a wider seam. As a result, very slender weld seams form during the laser welding and very high welding speeds are possible. On account of the heat conduction, the keyhole is surrounded by a molten bath, from which the integral connection forms on cooling.

Laser welding can be carried out with or without filler metal. The filler metal then serves for influencing the melt in terms of metallurgy, e.g. for avoiding solidification cracks, or for the configuration of the seam profile, e.g. in order to fill instances of underfilling.

During the welding of zinc-containing aluminum alloys, particular problems arise on account of the specific physical material properties. During laser welding, the zinc evaporates not only in the keyhole but also even in the molten bath. This leads to pores and therefore to welded connections of inferior quality. The higher the zinc content in the aluminum, the higher the strength of the material, but the weldability decreases since even more zinc can evaporate and forms pores.

It is an object of the present invention to provide a process for the laser beam welding of zinc-containing aluminum alloys in which no or only very few pores are formed.

SUMMARY OF THE INVENTION

The object is achieved by a process for joining workpieces made of zinc-containing aluminum alloys by means of laser beam welding, which is characterized in that firstly a layer consisting of vanadium is introduced into the joining gap between the workpieces to be connected, and the workpieces are then connected to one another by laser beam welding.

By introducing a layer made of vanadium into the joining gap between the workpieces to be connected, the pore content can be largely reduced. It is assumed that vanadium sets the zinc vapour and therefore prevents the formation of pores.

DETAILED DESCRIPTION OF THE INVENTION

The layer made of vanadium is preferably a vanadium foil. According to a further preferred embodiment, the vanadium layer is a powder coating applied to one of the workpieces to be connected at the site of the later joining gap. The vanadium layer or the vanadium foil preferably has a thickness of between 10 and 500 μm, particularly preferably a thickness of between 20 and 250 μm and in particular a thickness of between 30 and 100 μm, e.g. a thickness of 40 μm. The smaller the thickness of the foil, the more complete the fusion of the vanadium foil.

The workpieces can be welded to one another as is customary with and without filler wire.

According to a preferred embodiment, a workpiece thickness of 1 mm is welded per kW of laser power. By way of example, metal sheets which have a thickness of 2 mm and are made of aluminum alloys are welded with a laser power of 2.2 kW and a feed rate of 2 m/min to 3 m/min. Welding is preferably carried out under an inert gas atmosphere, it being possible for the inert gas to be argon and/or helium, for example. The focus diameter of the laser beam is preferably 100 μm to 500 μm, preferentially 200 μm to 400 μm, for instance 300 μm.

EXAMPLE

Two workpieces each made of a PA734 alloy, an aluminum alloy comprising approximately 8% by weight zinc, were connected to one another by laser beam welding, where in each case either no vanadium foil or a vanadium foil having a thickness of 250 μm, a vanadium foil having a thickness of 125 μm or a vanadium foil having a thickness of 40 μm was introduced into the joining gap between the workpieces. Given a metal sheet thickness of 2 mm and a focus diameter of 300 μm, the work was carried out with powers of between 2.0 and 2.2 kW and rates of 2 to 3.5 m/min. The weld seams were investigated by means of X-rays.

Without a vanadium foil, there was a high porosity of the weld seams, whereas the use of all vanadium foils led to a virtually complete freedom from pores. In contrast to the foil having a thickness of 40 μm, incomplete fusion of the foil was observed, however, in the case of the foils having a thickness of 125 μm and 250 μm.

The invention claimed is:

1. Process for joining workpieces made of zinc-containing aluminium alloys by means of laser beam welding, characterized in that firstly a layer consisting of vanadium is introduced into the joining gap between the workpieces to be connected, and the workpieces are then connected to one another by laser beam welding.

2. Process according to claim 1, characterized in that the layer made of vanadium is a vanadium foil having a thickness of between 10 and 500 μm.

3. Process according to claim 2, characterized in that the layer made of vanadium is a vanadium foil having a thickness of between 20 and 250 μm.

4. Process according to claim 3, characterized in that the layer made of vanadium is a vanadium foil having a thickness of between 30 and 100 μm.

5. Process according to claim 1, characterized in that the laser beam welding is effected with filler wire.

6. Process according to claim 2, characterized in that the laser beam welding is effected with filler wire.

7. Process according to claim 3, characterized in that the laser beam welding is effected with filler wire.

8. Process according to claim 4, characterized in that the laser beam welding is effected with filler wire.

\* \* \* \* \*